United States Patent [19]

Kawamura

[11] Patent Number: 4,871,113
[45] Date of Patent: Oct. 3, 1989

[54] VEHICLE HEATING CONTAINER APPARATUS

[75] Inventor: Hideo Kawamura, Samukawa, Japan
[73] Assignee: Isuzu Motors Limited, Tokyo, Japan
[21] Appl. No.: 946,943
[22] Filed: Dec. 29, 1986
[30] Foreign Application Priority Data Dec. 28, 1985 [JP] Japan ................... 60-299344

[51] Int. Cl.$^4$ ........................................... G05D 23/00
[52] U.S. Cl. ...................... 237/2 A; 62/236; 237/12.3 C; 237/28
[58] Field of Search ............ 62/236; 237/12.3 C, 237/12.3 R, 2 A, 28, 29, 5; 165/42, 43

[56] References Cited

U.S. PATENT DOCUMENTS

| | | | |
|---|---|---|---|
| 1,998,808 | 4/1935 | Gates | 237/12.4 |
| 3,024,835 | 3/1962 | Ryder | 158/28 |
| 3,362,637 | 1/1968 | Connell | 237/2 A |
| 3,521,030 | 7/1970 | Maahs | 219/202 |
| 3,974,660 | 8/1976 | Farr | 62/236 |
| 3,976,458 | 8/1976 | Krug | 62/236 X |
| 4,105,158 | 8/1978 | Hasebe et al. | 237/123 |
| 4,411,385 | 10/1983 | Lamkewitz | 237/2 A |
| 4,519,772 | 5/1985 | Mittmann | 431/45 |

FOREIGN PATENT DOCUMENTS

| | | |
|---|---|---|
| 3248412 | 7/1984 | Fed. Rep. of Germany . |
| 1571378 | 6/1969 | France . |
| 2372533 | 6/1978 | France . |

*Primary Examiner*—Henry A. Bennet
*Attorney, Agent, or Firm*—Staas & Halsey

[57] ABSTRACT

A heating container apparatus is provided for supplying heated air into a heating container on a vehicle for heating or keeping warm the cargo in the heating container, including a burner with an atomizing glow plug and an ignition glow plug; a heat exchanger for recovering heat generated by the burner; an air blower device for circulating heated air; a temperature control device, and a voltage control device. The voltage control device is supplied with electric power from a commercial power feed line to produce a voltage equal to the voltage of a power supply mounted on the vehicle, thereby keeping the interior of the heating container warm even when the engine of the vehicle is stopped. The temperature control device keeps the temperature in the heating container in a suitable temperature range at all times.

6 Claims, 2 Drawing Sheets

VEHICLE HEATING CONTAINER APPARATUS

BACKGROUND OF THE INVENTION

The present invention relates to an automotive heating container apparatus for supplying heat to a heating container mounted on a vehicle to keep the contents of the heating container warm.

One known heating container apparatus used on a vehicle for transporting foods or chemicals is disclosed in Japanese Laid-Open Utility Model Publication No. 58-13089. The foods or chemicals carried on the vehicle are heated or kept warm by the heat of the exhaust gas emitted from the engine of the vehicle. Another conventional heating container apparatus uses, as a heat source, the energy of the engine coolant.

Some foods, which are required to be delivered early in the morning, should preferably be loaded on the vehicle the night before delivery. However, where the exhaust gas or the engine coolant is utilized as the heat source, it would be quite difficult or almost impossible to heat the cargo or keep it warm for a long period of time throughout the night while the vehicle is at rest because of the limited capacity of the battery, for example. Therefore, it has been customary in most cases to load the freight early in the morning just prior to transportation.

SUMMARY OF THE INVENTION

In view of the aforesaid drawbacks of the conventional vehicle heating container apparatus, it is an object of the present invention to provide a vehicle heating container apparatus for keeping the interior of a heating container at a desired temperature by operating a control device with electric power from a power supply other than the vehicle-mounted power supply when the vehicle is at rest for a long period of time.

Another object of the present invention is to provide a vehicle heating container apparatus for keeping the interior of a heating container at a desired temperature by operating a control device with the voltage from a power supply other than the vehicle-mounted power supply, the voltage being stabilized by a switching-regulator-type constant-voltage device.

Still another object of the present invention is to provide a vehicle heating container apparatus for keeping the interior of a heating container at a desired temperature by operating a control device with the commercially available voltage, which is stabilized by a phase-control switching-regulator-type constant-voltage device employing a thyristor.

A still further object of the present invention is to provide a vehicle heating container apparatus for keeping the temperature in a heating container in an appropriate temperature range by using a control device including means for comparing the temperature in the heating container with appropriately defined upper and lower limit temperatures.

To accomplish the above objects, there is provided according to the present invention a vehicle heating container apparatus including: a burner for combusting fuel; a heat exchanger for recovering heat generated by the burner to introduce hot air into a heating container; a control device for controlling the hot air to be introduced into the heating container with a temperature signal from a container temperature sensor disposed in the heating container; and voltage control means for controlling the voltage of a power supply other than a vehicle-mounted power supply so that the voltage thereof can be selected to be equal to a given voltage of the vehicle-mounted power supply, and for operating the control device with electric power from said other power supply when the engine of the vehicle is stopped.

While the vehicle is running, electric power from the vehicle-mounted power supply is employed, and while the vehicle is at rest for a long period of time, electric power from a commercial power supply is employed. The interior of the heating container can be kept at a suitable temperature at all times by the electric power supply thus provided.

As described above, during stoppage of the vehicle for a long interval of time, electric power is supplied from the commercial power supply available at home, rather than an automobile battery, to keep the interior of the heating container at the desired temperature. Therefore, foods or the like can be loaded on the vehicle the previous night, and can be delivered early the next morning without any loading operation.

The above and other objects, features and advantages of the present invention will become more apparatus from the following description when taken in conjunction with the accompanying drawings in which preferred embodiments of the present invention are shown by way of illustrative example.

DETAILED DESCRIPTION OF THE PREFERRED EMBODIMENTS

Figure 1:
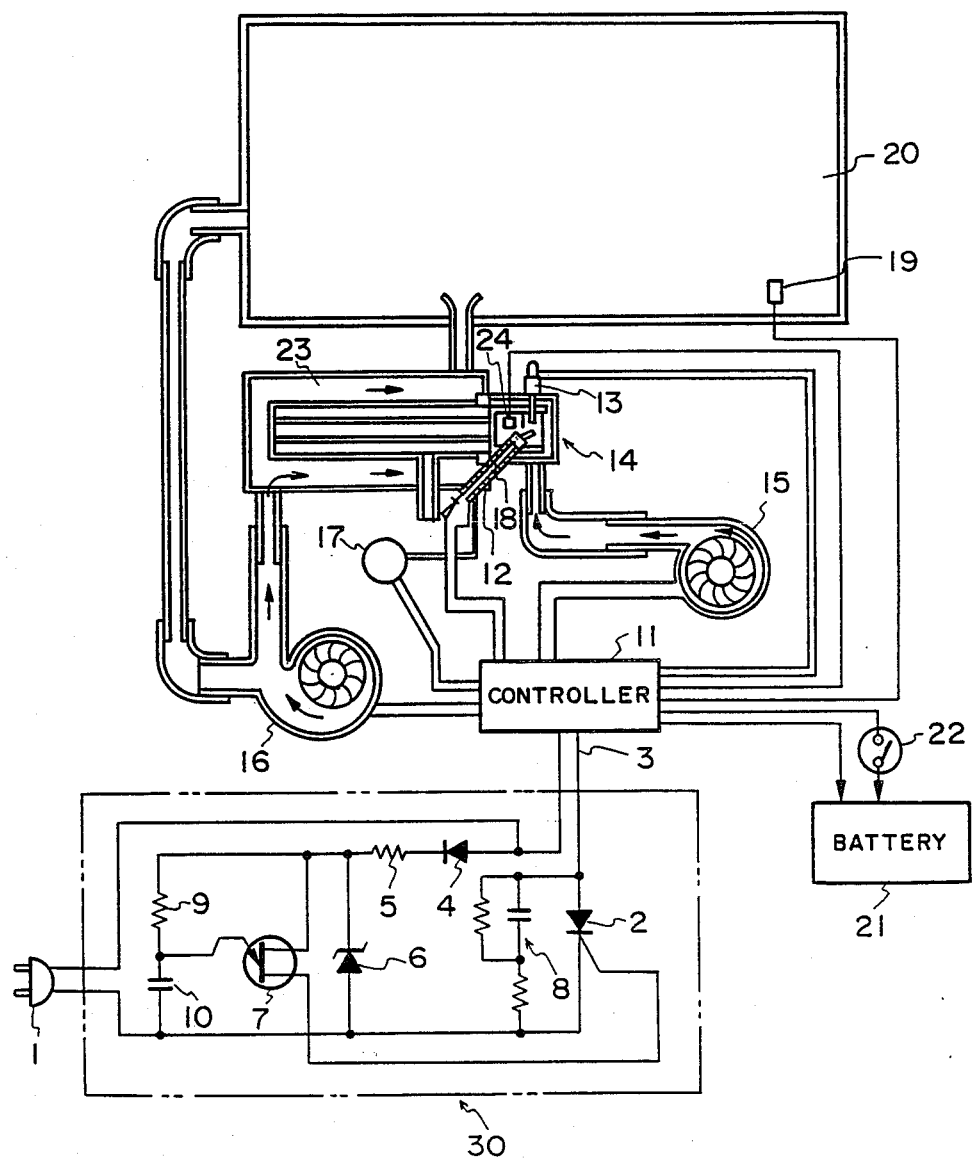
FIG. 1 is a schematic diagram of a burner device for use in a vehicle heating container according to the present invention.

FIG. 1 shows a power supply, generally designated by the reference numeral 30, which can be used in place of a vehicle-mounted battery 21 when the engine of a vehicle is stopped. The power supply 30 is supplied with ordinary 100V AC power via a plug 1 to produce DC power at 24V or 12V, equal to a battery voltage of 24V or 12V. The 24V or 12V DC power is supplied via wires 3 and a controller 11 to an atomizing glow plug 18, an ignition glow plug 13, a first blower 15, a second blower 16, and a fuel pump 17.

The power supply 30 includes a thyristor 2, a diode 4, a resistor 5, a zener diode 6, a unijunction transistor 7, a protective circuit 8 for protecting the thyristor 2 from excessive voltage, a resistor 9, and a capacitor 10. The thyristor 2 serves to rectify the AC power only when a positive voltage is applied to its gate. The diode 4 and the resistor 5 apply a rectified positive voltage to the cathode of the zener diode 6, which keeps the voltage thereacross (anode-to-cathode voltage) in a range from 10V to 20V. The unijunction transistor 7, the resistor 9, and the capacitor 10 jointly constitute a charging/discharging circuit which, when discharged, applies a positive voltage to the gate of the thyristor 2 to render the same conductive. The time of one cycle of the charging/discharging circuit is established by appropriately selecting the time constant of the resistor 9 and the capacitor 10. Therefore, the power supply 30 can produce a equal to the voltage 24V or 12V DC of the battery 21 by selecting the breakdown voltage of the zener diode 6 and the time constant of the resistor 9 and the capacitor 10.

The controller 11 is in the form of an electronic control device which is programmed according to an operation sequence (described later) for controlling the atomizing glow plug, the ignition glow plug, the first and second blowers, and the fuel pump. A burner 14 has an atomizer 12 for atomizing fuel supplied from the fuel pump 17 by heating the fuel with the atomizing glow plug 18, and the ignition glow plug 13 for igniting a mixture of the fuel atomized by the atomizer 12 and air introduced by the first blower 15. The combustion gas produced by the burner 14 is discharged through a heat exchanger 23 into the atmosphere. The second blower 16 draws in air and supplied the same into the heat exchanger 23, from which hot air is delivered into a heating container 20. Reference numeral 19 represents a container temperature sensor for sensing the temperature in the heating container 20, while 21 denotes a battery, 22 a changeover switch, and 24 a combustion sensor.

Figure 2:
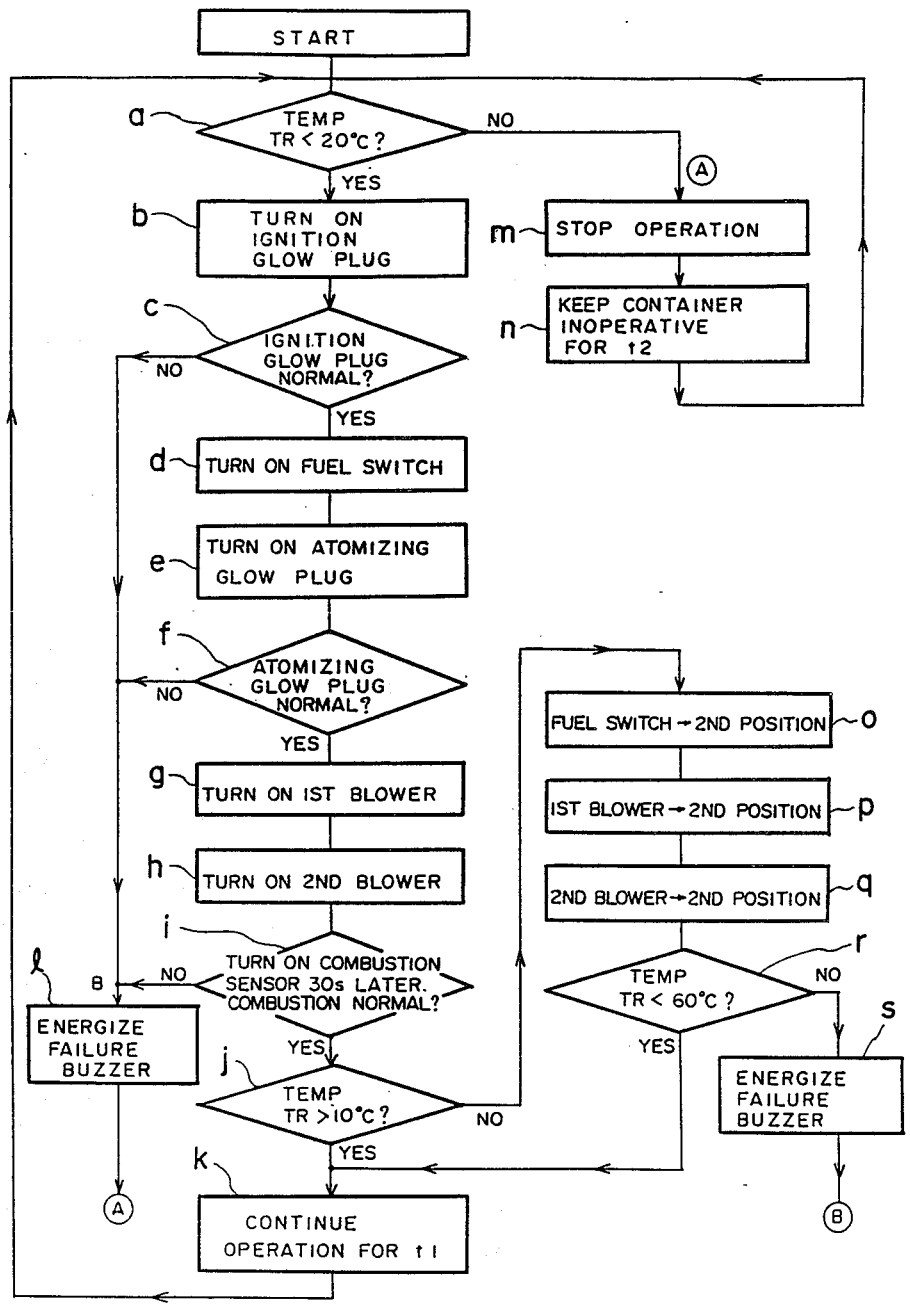
FIG. 2 is a flowchart of an operation sequence of temperature control for the automotive heating container.

Temperature control for the automotive heating container will be described with reference to the flowchart of FIG. 2.

In order to operate the heating container 20 when the engine is stopped, the changeover switch 22 is actuated to select the power supply 30, and the plug 1 is connected to a receptable for obtaining the 100V AC power. The temperature TR in the heating container 20 is measured by the container temperature sensor 19. A step a ascertains whether the temperature TR is lower than an upper limit such as 20° C. If yes, then the ignition glow plug 13 is turned on in a step b, which is followed by a step c that checks if the ignition glow plug 13 is normal or not. If the ignition glow plug 13 is normal, then control proceeds to a step d in which a fuel switch (not shown) is turned on, and then to a step e in which the atomizing glow plug 18 is turned on. A next step f ascertains whether the atomizing glow plug 18 is normal or not. If normal, then the first and second blowers 15, 16 are turned on in respective steps g, h. The conbustion sensor 24 is turned on 30 seconds later, and whether combustion is normal or not is ascertained in a step i. If normal operation in each of the steps c, f, and i, is not ascertained, then control goes to a step l in which a failure buzzer (not shown) is energized.

A step j then ascertains whether the container temperature TR is higher than a lower limit such as 10° C. If yes, then operation of the heating container is continued for a time $t_1$ in a step k.

If the container temperature TR is lower than the lower limit, then control goes to a step o which brings the fuel switch into a second position or setting to increase the amount of fuel supplied. Thereafter, the first and second blowers 15, 16 are brought into a second position or setting to increase the amount of supplied air in respective steps p, q to cause the container temperature TR to be raised quickly up to 20° C. then, a step r ascertains whether the temperature TR in the heating container is lower than 60° C., for example. If the temperature TR is lower than 60° C., then control goes to the step k. If the temperature TR is higher than 60° C. due to a failure of the combustion control system for the heating container apparatus of the invention, then the failure buzzer is energized in a step s.

If the container temperature TR is higher than the upper limit or 20° C., then control goes to a step m in which operation of the heating container is stopped.

The step m is followed by a step n which keeps the heating container inoperative for a time $t_2$.

With the arrangement of the present invention, as described above, while the vehicle is being held at rest for a long period of time, electric power is supplied not from the vehicle-mounted battery, but from a commercial power supply available at home, for keeping the vehicle heating container in a desired temperature range. Therefore, cargo such as foods can be loaded the previous night, kept at a desired temperature through the night, and delivered early the next morning without any morning loading operation required.

While in the above embodiment a thyristor phase control circuit is employed as the power supply 30, another constant-voltage power supply employing a transformer or a thyristor rectifier capable of producing 24V or 12V DC power from 100V AC power may be employed instead of the illustrated power supply.

Although certain preferred embodiments have shown and described, it should be understood that many changes and modifications may be made therein without departing from the scope of the appended claims.

What I claim is:

1. A vehicle heating container apparatus for supplying heat to a heating container, associated with a vehicle having an engine, to keep the contents of the heating container within a temperature range having upper and lower limits, said vehicle heating container apparatus comprising:

a burner for combusting fuel;

fuel supply means, including an atomizer connected to said burner, for supplying the fuel to said burner and atomizing the fuel supplied to said burner;

first air blower means for supplying air to said burner;

second air blower means for introducing air into the heating container;

heat exchanger means for recovering heat generated by said burner to heat the air to be introduced into the heating container;

a container temperature sensor for producing a temperature signal indicative of the temperature inside the heating container;

temperature control means for controlling, in dependence upon the temperature signal from said temperature sensor disposed in the heating container, said first and second air blower means and said fuel supply means to maintain the temperature in the heating container within the temperature range, said first and second air blower means and said fuel supply means each having a first setting for supplying air and fuel when said temperature control means initially detects that the temperature inside the heating container is below the lower limit of the temperature range and a second setting for supplying increased amounts of air and fuel when said temperature control means detects that the temperature inside the heating container is below the lower limit of the temperature range and said first and second air blower means and said fuel supply means are respectively supplying air and fuel;

a first power supply operatively connected to said temperature control means and associated with the vehicle;

a second power supply remote from the vehicle; and voltage control means for controlling the voltage supplied from said second power supply so that the voltage supplied from said second power supply can be selected to be equal to a given voltage supplied from said first power supply, and for operating said temperature control means and said first and second air blower means with electric power from said second power supply when the engine of the vehicle is stopped.

2. A vehicle heating container apparatus according to claim 1, wherein said voltage control means comprises a switching-regulator-type constant-voltage device operatively connected to said temperature control means.

3. A vehicle heating container apparatus according to claim 1, wherein said voltage control means comprises a phase-control switching-regulator-type constant-voltage device employing a thyristor and operatively connected to said temperature control means.

4. A vehicle heating container apparatus according to claim 1, wherein said voltage control means comprises:
 a switching element operatively connected to said second power supply,
 a rectifying element operatively connected to said switching element and said temperature control means,
 a phase control thyristor operatively connected to said switching element and said temperature control means, and
 a protective circuit, operatively connected to said phase control thyristor for protecting said phase control thyristor against excessive voltage.

5. A vehicle heating container apparatus according to claim 1, wherein said second power supply comprises a commercially available AC power supply.

6. A vehicle heating container apparatus according to claim 1,
 wherein said burner comprises an atomizing glow plug, an ignition glow plug, and a combustion sensor,
 wherein said first air blower means comprises a first blower operatively connected to said temperature control means, and
 wherein said second air blower means comprises a second blower operatively connected to said temperature control means.

* * * * *